US011327646B2

(12) United States Patent
Tran et al.

(10) Patent No.: US 11,327,646 B2
(45) Date of Patent: May 10, 2022

(54) MODIFYING ILLUMINATION CHARACTERISTICS OF AN INPUT DEVICE TO IDENTIFY CHARACTERS ASSOCIATED WITH PREDICTED WORDS

(71) Applicant: International Business Machines Corporation, Armonk, NY (US)

(72) Inventors: Richard V. Tran, San Jose, CA (US); Heidi Lagares-Greenblatt, Jefferson Hills, PA (US); Kevin David Hite, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 16/585,706

(22) Filed: Sep. 27, 2019

(65) Prior Publication Data
US 2021/0096716 A1 Apr. 1, 2021

(51) Int. Cl.
*G06F 3/0487* (2013.01)
*G06F 3/0482* (2013.01)
*G06F 16/31* (2019.01)
*G06F 3/04845* (2022.01)
*G06F 40/205* (2020.01)
*G06F 40/284* (2020.01)

(52) U.S. Cl.
CPC .......... *G06F 3/0487* (2013.01); *G06F 3/0482* (2013.01); *G06F 3/04845* (2013.01); *G06F 16/313* (2019.01); *G06F 40/205* (2020.01); *G06F 40/284* (2020.01)

(58) Field of Classification Search
None
See application file for complete search history.

(56) References Cited

U.S. PATENT DOCUMENTS

| 4,940,346 A | 7/1990 | Liljenquist |
| 5,314,337 A | 5/1994 | Dixon |
| 6,850,225 B1 | 2/2005 | Whitcroft |
| (Continued) | | |

OTHER PUBLICATIONS

"6 Of The Best Apps for Teaching Kids Typing on Mac", Jul. 24, 2015, Educational Technology and Mobile Learning, 3 pps., <https://www.educatorstechnology.com/2015/07/6-of-best-apps-for-teaching-kids-typing.html>.

(Continued)

*Primary Examiner* — Cesar B Paula
*Assistant Examiner* — John M Heffington
(74) *Attorney, Agent, or Firm* — Daniel R. Simek; Alexander G. Jochym

(57) ABSTRACT

A method for modifying visual aspects of a keyboard in response to a user typing on the keyboard. The method includes one or more computer processors receiving a first character input to an input device. The method further includes determining a plurality of words that begin with the first received character. The method further includes ranking the determined plurality of words. The method further includes selecting a word from among the ranked plurality of words based on a first set of criteria. The method further includes determining a sequence of one or more characters after the received first character that correspond to the selected word. The method further includes modifying one or more respective characteristics of input elements of the input device that correspond to the sequence of characters of the selected word.

20 Claims, 4 Drawing Sheets

(56) References Cited

U.S. PATENT DOCUMENTS

| | | | |
|---|---|---|---|
| 9,696,904 B1* | 7/2017 | Mohapatra | G16H 40/63 |
| 2013/0046544 A1* | 2/2013 | Kay | G06F 16/3322 |
| | | | 704/275 |
| 2015/0334799 A1* | 11/2015 | Ascorra | G06F 1/16 |
| | | | 315/76 |
| 2016/0364140 A1* | 12/2016 | Shkedy | G09B 19/0053 |
| 2017/0123492 A1* | 5/2017 | Marggraff | H04N 5/247 |

OTHER PUBLICATIONS

"Using The Keyboard; Keyboard Basics—Magellan smartGPS User Manual", 2012-2019 ManualsLib.com, 4 pps., <https://www.manualslib.com/manual/564191/Magellan-Smartgps.html?page=29>.

"Yamaha EZ-200 61 Full-Sized Touch Sensitive Lighted Keyboard Bundl", Amazon, 8 pps., printed from the Internet on Sep. 19, 2019, <https://www.amazon.com/Yamaha-Full-Sized-Sensitive-LightedKeyboard/dp/B001FSJC5A>.

* cited by examiner

MODIFYING ILLUMINATION CHARACTERISTICS OF AN INPUT DEVICE TO IDENTIFY CHARACTERS ASSOCIATED WITH PREDICTED WORDS

BACKGROUND OF THE INVENTION

The present invention relates generally to the field of input/out devices, and more particularly to modifying illumination of a keyboard to provide speculative auto-complete character suggestions.

Input devices for computers and electronics that include computer-like capabilities can be embedded hardware, such as a keyboard of a laptop computer; a wired or wireless keyboard that interfaces with a computer; and virtual keyboards. Graphical or virtual keyboards are software constructs that allow input of characters without the need of physical keys. The interaction of a user with a graphical or virtual keyboard can occur via a touchscreen interface, an augmented reality interface, or a virtual reality interface. Graphical (e.g., simulated) keyboards are common on various mobile devices, such as cell phone and tablet computers; and on computing devices that are shared by many user and can be exposed to a variety of environmental conditions, such as kiosks and automated teller machines As an aid to users, many operating systems and/or software applications can include autocorrection or word suggestions features that display potential words or phrases in a separate graphical display area from the input elements (e.g., keys or characters) of a graphical or virtual keyboard.

SUMMARY

According to an aspect of the present invention, there is a method, computer program product, and/or computer system for modifying visual aspects of a keyboard in response to a user typing on the keyboard. In an embodiment, the method includes at least one computer processor receiving a first character input to an input device. The method further includes at least one computer processor determining a plurality of words that begin with the first received character. The method further includes ranking the determined plurality of words. The method further includes at least one computer processor selecting one or more words from among the ranked plurality of words based on a first set of criteria. The method further includes at least one computer processor determining a sequence of one or more characters after the received first character that correspond to a word selected from among the ranked plurality of words. The method further includes at least one computer processor modifying one or more respective characteristics of input elements of the input device that correspond to the sequence of characters of the selected word.

DETAILED DESCRIPTION

Figure 1:
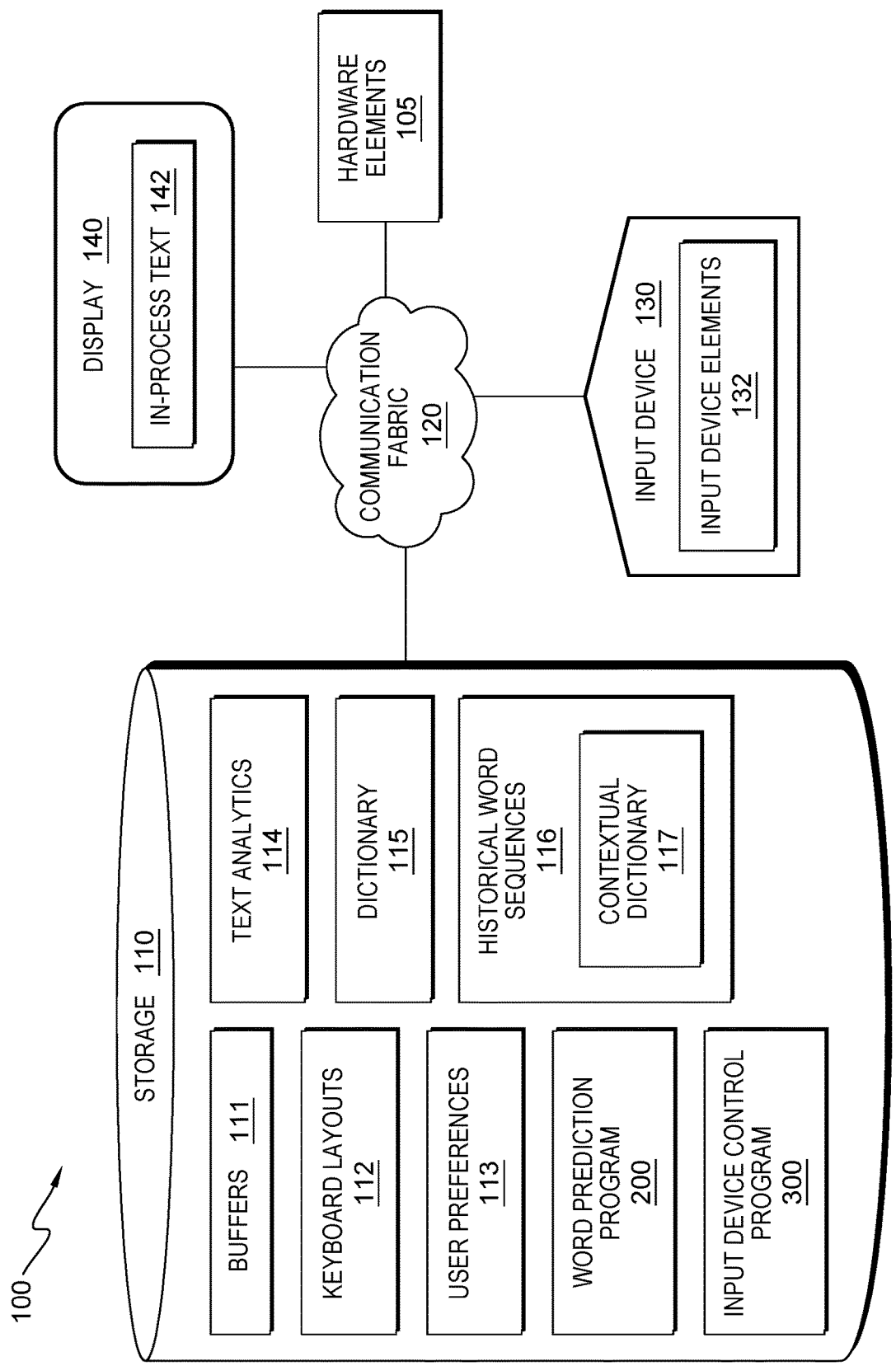
FIG. 1 illustrates a computing device environment, in accordance with an embodiment of the present invention.

Embodiments of the present invention recognize that advances in touchscreen devices, virtual assistants, voice-to-text applications, auto-fill functions, and auto-complete functions have made the utilization of various mobile devices and computing devices easer to operate and more intuitive to learn. Such improvements can be utilized by all age groups and can be helpful to younger individuals. However, advances such as virtual assistants, voice-to-text functions, and auto-fill functions do not contribute to an individual learning to effectively utilize various input devices, such as a touchscreen, a physical keyboard, and/or a virtual keyboard.

Embodiments of the present invention also recognize that various typing tutors are available to teach a user to utilize a keyboard. However, one drawback to various typing tutors is that the typing tutor program is based on repetitious practicing of defined fingering (e.g., touch and movement) patterns that are specific to a given language and keyboard configuration. A typing tutor program generalizes the training of a user and is based on expected hand and finger positions. A typing tutor does not consider the program that the user utilizes; document type, a context associated with a communication, word usage frequency; and/or the physical relationship between an input device and a user (e.g., handling a device). For example, a full-size keyboard depicts and presents one type of key arrangement to a user; and a touchscreen of a mobile device presents a different arrangement of keys to the user. Embodiments of the present invention also recognize that on a mobile device, some characters (i.e., keys) and function are accessed via secondary screens and are located in positions related to various alpha-characters of a key arrangement of a previous screen or the home screen.

Embodiments of the present invention further recognize that users can create custom keyboard arrangements based on user preferences; user constraints, such as movement restrictions; an arrangement of key specific to the operations of a particular software application; and/or configuration enables the user to more efficiently utilize a particular software application. Therefore, typing tutor programs do not facilitate the learning of keystroke patterns associated with everyday digital activities of users.

Embodiments of the current invention improve the ability of a user learn keystroke patterns or sequences of keys or other character input elements associated with everyday digital activities by predicting or speculating on subsequent characters of potential words. Embodiments of the present invention generate an educational keyboard by modifying the illumination characteristics of elements of an input device that are associated with subsequent characters of the one or more predicted words. For example, modifying an illumination level (e.g., brightness) for characters common to words and changing colors of characters associated with differing words. Embodiments of the present invention enable a user to abstract input patterns of keys (i.e., keystrokes) to a context in which the words and an input device (e.g., a physical keyboard, a graphical keyboard, a virtual keyboard, etc.) are utilized.

Embodiments of the current invention can further contextualize and differentiate word choices and word patterns associated with specific user activities to improve word predictions and corresponding illumination characteristic modifications of subsequent characters. Embodiments of the present invention utilize language dictionaries and text analytics to learn patterns of words and phrases commonly utilized by a user. As patterns of words and phrases are learned, embodiments of the current invention create various contextual dictionaries and lists of historical word sequences that further facilitate and improve the accuracy of word predictions and the illumination of subsequent characters depicted on an input device.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating computing device environment 100, in accordance with embodiments of the present invention. In one embodiment, computing device environment 100 may represent a computing device of a user, such as a laptop computer, a tablet computer, a netbook computer, a personal computer, a desktop computer, a personal digital assistant (PDA), a smart phone, a wearable devices (e.g., smart glasses, smart watches, e-textiles, AR headsets, etc.), or any programmable computer systems known in the art. Computing device environment 100 may include components, as depicted and described in further detail with respect to FIG. 4, in accordance with embodiments of the present invention.

In another embodiment, various elements of computing device environment 100 are hosted and/or are accessible via a network connection operatively coupled with communication fabric 120 and/or one or more elements of hardware elements 105 that connects to one or more other computing systems (not shown) via an intranet or the Internet. In some scenarios, various of elements of storage 110 are included in a cloud computing application; and input device 130 and input device elements 132 are representative of a graphical input device presented to a user via display 140 (e.g., a touchscreen) that is based on a graphical user interface (GUI) generated the cloud computing application. In another scenario, in response to a user utilizing a web application that includes a plug-in associated with the word prediction program 200, keyboard layouts 112 and user preferences 113 are uploaded to the website. Subsequently, word prediction program 200 interfaces in near-real time with input device control program 300 executing on a computing device of the user to control aspects of input device 130.

In an embodiment, computing device environment 100 includes hardware elements 105, storage 110, communication fabric 120, input device 130, and display 140. In various embodiments, hardware elements 105 includes a plurality of hardware elements of a computing device discussed in further detail with respect to FIG. 4. In some embodiment, hardware elements 105 also includes a keyboard control (not shown) unit that can modify one or more illumination characteristics of input device 130 respectively associated with one or more characters of input device elements 132. The keyboard control unit may be included within a system-on-chip (SOC) device, a controlling logic unit (CLU), or another discreet component within a computing device of a user, represented by computing device environment 100.

In one embodiment, storage 110 is representative of storage within a computing device of a user and may include a combination of volatile memory, non-volatile memory, and/or persistent storage. Storage 110 includes, buffers 111, keyboard layouts, 112, user preferences 113, text analytics 114, one or more instances of dictionary 115, historical word sequences 116, word prediction program 200, and input device control program 300. Storage 110 may also include a plurality of programs and data (not shown), such as a plurality of native software applications. Native software applications may include a web browser, a texting application, a word processor, a presentation program, etc. In some embodiments, storage 110 includes an allocation of storage space assigned to store illumination settings and characteristics determined by input device program 300 that correspond to a set of input device elements 132 and are respectively associated with an application, a GUI window, or a web browsing tab.

In an alternative embodiment, one or more elements of storage 110 reside (e.g., are hosted) within a computing system different from the computing device of a user. For example, text analytics 114, one or more instances of dictionary 115, historical word sequences 116, one or more instances of contextual dictionary 117, and word prediction program 200 reside as a service on a website (not shown).

In an embodiment, buffers 111 is representative of a set of buffers that store various inputs and information, such as an input character, in-process text 142, and a plurality of predicted. Buffers 111 may be allocated from volatile memory, non-volatile memory, persistent storage, or a combination thereof. In some embodiments, a buffer of buffers 111 is utilized to store predicted words generated by word prediction program 200. In another embodiment, buffers 111 is representative of differing sets of buffers respectively associated with applications, GUI windows, web browsing tabs, and/or instances of word prediction program 200.

Keyboard layouts 112 may include one or more arrangements (e.g., layouts, configurations) for a plurality of input device elements 132 respectively associated with instance of input device 130. In various embodiments, keyboard layouts 112 includes arrangements of keys, buttons, etc., corresponding to a language; and are further associated with layout style, such as QWERTY, AZERTY, Colemak, Workman, etc. In some embodiments, keyboard layouts 112 also include one or more custom keyboard configurations for a given software application and/or keyboard layouts created by a user. In another embodiment, a keyboard layout of keyboard layouts 112 is downloaded to create a graphical instance of input device 130 or a virtual instance of input device 130 that includes a plurality of respective character elements representative of input device elements 132.

User preferences 113 include a plurality elements, such as rules, preferences, settings, and parameters utilize to determine word predictions and to modify the illumination of subsequent characters corresponding to one or more predicted words. In some embodiments, user preferences 113 includes rules related to a hierarchy of preferences, setting, and/or parameters that are affected aspects of computing device environment 100. In one example, user preferences 113 may include rules for utilizing different setting related to input device elements 132 based on the capabilities of input device 130, such as available colors and brightness levels for an instance input device 130. In another embodiment, one or more elements of user preferences 113 are affected by constraints relate to input device 130. In another example, a physical keyboard (i.e., input device 130) of one manufacturer includes adjustable color and intensity LEDs enabling one set of preferences, settings, and/or characteristics. Whereas, a physical keyboard of another manufacturer includes only white-light LEDs; thereby constraining the number of predicted words choices and illumination characteristics.

Preferences may include language, dictionary, and keyboard style defaults; an indication related to predicting compound words; a method for generating ranking for predicted words; etc. Preferences can also include criteria, such as a hierarchy for grouping words by parts of speech that is in response to ranking a plurality of words. For example, nouns rank higher that adjectives, and adjectives rank higher than adverbs. Another preference may dictate how to respond to different words that have another common letter further within a sequence of subsequent letters, such as maintaining the color for the larger set of words or apply a differing color to a later common character. Other preferences affect the displaying of potential characters, such as color as opposed to strobing to illuminate a predicted character, depicting a letter common to two or more predicted words, etc. Settings include, but are not limited to, a value for the number of words to predict, a number of characters to display for a sequence of potential characters, a number of predicted word branches to display, a number of words selected from among predicted words by ranking values, etc.

Parameters include color and illumination (e.g., brightness, intensity, saturation, etc.) characteristics associated with input elements 132 that are respectively associated with characters of one or more predicted words. For example, parameters may include: a color associated with a primary potential word, a color respectively associated with a branch of characters of another predicted word, illumination brightness percentages respectively associated with a sequence of predicted characters, a strobing pattern, and a strobing rate (i.e., frequency). Illumination characteristic are discussed in further detail with respect to input device 130.

Text analytics 114 is a suite of programs and functions that analyze text input by a user of a computing device while performing various tasks and/or executing one or more applications. Text analytics 114 may include categorizing, grammar, syntax, functions; statistical analysis techniques (e.g., frequency of word use, probability of word use, etc.); context analysis; and other capabilities known in the art. In various embodiments, text analytics 114 generates a data structure, such as an associative array that relates words, terms, and phrases to frequencies of use, probabilities of use, and contexts of use by a user of computing device environment 100. Aspects of text analytics 114 are utilized to determine relationships between one or more words 114 that can be used to filter or group words, such as grammar, tense, parts of speech, etc. The data structure generated by text analytics 114 may be stored within historical word sequences 116. Alternatively, or in addition to a data structure, text analytics 114 may apply metadata labels to (e.g., tag) words, terms, and phrases input by a user.

In some embodiments, text analytics 114 utilizes one or more elements of user preferences 113 to determine whether a threshold of occurrences of usage of a word, term, or phrase occurs. In response, text analytics 114 creates and/or updates historical word sequences 116, contextual dictionary 117, and/or a related data structure. In another embodiment, text analytics 114 can also execute in the background to continually monitor, aggregate, and update the analyses related to the text input by a user. Text analytics 114 periodically updates historical word sequences 116, contextual dictionary 117, and/or the related data structure based on the updated analyses. For example, the periodic updates by text analytics 114 may be based on a user preference and/or in response to a user initiating a shutdown of a computing device.

Various embodiments of the present invention may utilize various data sources, such as buffers 111, user preferences 113, historical word sequences 116, and contextual dictionary 117, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, disclosure by transmission, dissemination, use, or otherwise making available, combination, restriction, erasure, or destruction performed on personal data. Text analytics 114 also enables the authorized and secure processing of personal data. Text analytics 114 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Text analytics 114 provides information regarding personal data and the nature (e.g., type, scope, purpose, duration, etc.) of the processing. Text analytics 114 provides the user with copies of stored personal data. Text analytics 114 allows the immediate deletion of personal data.

Dictionary 115 is representative of one or more dictionaries of words and terms. An instance of dictionary 115 may be a language dictionary, such as English or French; a technical dictionary related to a field of study, such as music, engineering, computer science, archeology, etc.; or genre of interest, such as movies, plays, literature, etc. In various embodiments, words and terms within an instance of dictionary 115 are also included within or referenced to historic word sequences 116. Instances of dictionary 115 may be download to a computing device of a user or are network-accessible, such as accessed via the Internet.

Historic word sequences 116 includes a plurality of phrases and groups of words that text analytics 114 determines the user utilized above a threshold frequency or number of occurrences. In an embodiment, words, terms, and phrases within historic word sequences 116 are further identified, sorted, and aggregated for inclusion within one or more instances of contextual dictionary 117. Some instances of historic word sequences 116 are stored on the computing device of a user. Other instances of historic word sequences 116 and contextual dictionary 117 may be stored on the Internet and are accessible as a service (not shown).

Contextual dictionary 117 is representative of one or more groups or lists of words, terms, and/or phrases compiled over time by text analytics 114 that are further associated with frequency of user and/or a context of use (e.g., a particular software application) by the user. In one embodiment, contextual dictionary 117 is representative of a data structure that interrelates words, context of usage of a word, probability of use associated with word within a context, etc., as opposed to a plurality individual contextual dictionaries and included plurality of words and terms. In another embodiment, instances of contextual dictionary 117 are identified via metadata that signifies a usage context of a word or term. An instance of contextual dictionary 117 may include a plurality of words and terms that are each tagged one or more metadata labels that indicate a usage context for a word, a term, or a phrase. In some embodiments, contextual dictionary 117 is a data structure that is further augmented with metadata.

In some embodiments, contextual dictionary 117 includes words and terms that are not found within instances of dictionary 115, such as purposeful misspellings, texting shortcuts, names, foreign words commonly used by a user, blogging terms, vernacular terms, slang, etc. In an embodiment, some words and terms are included within or referenced to more than one instance of contextual dictionary 117. In various embodiments, instances of contextual dictionary 117 are utilized by word prediction program 200 to rank a determined plurality of potential words based on one or more characters input by a user.

Figure 4:
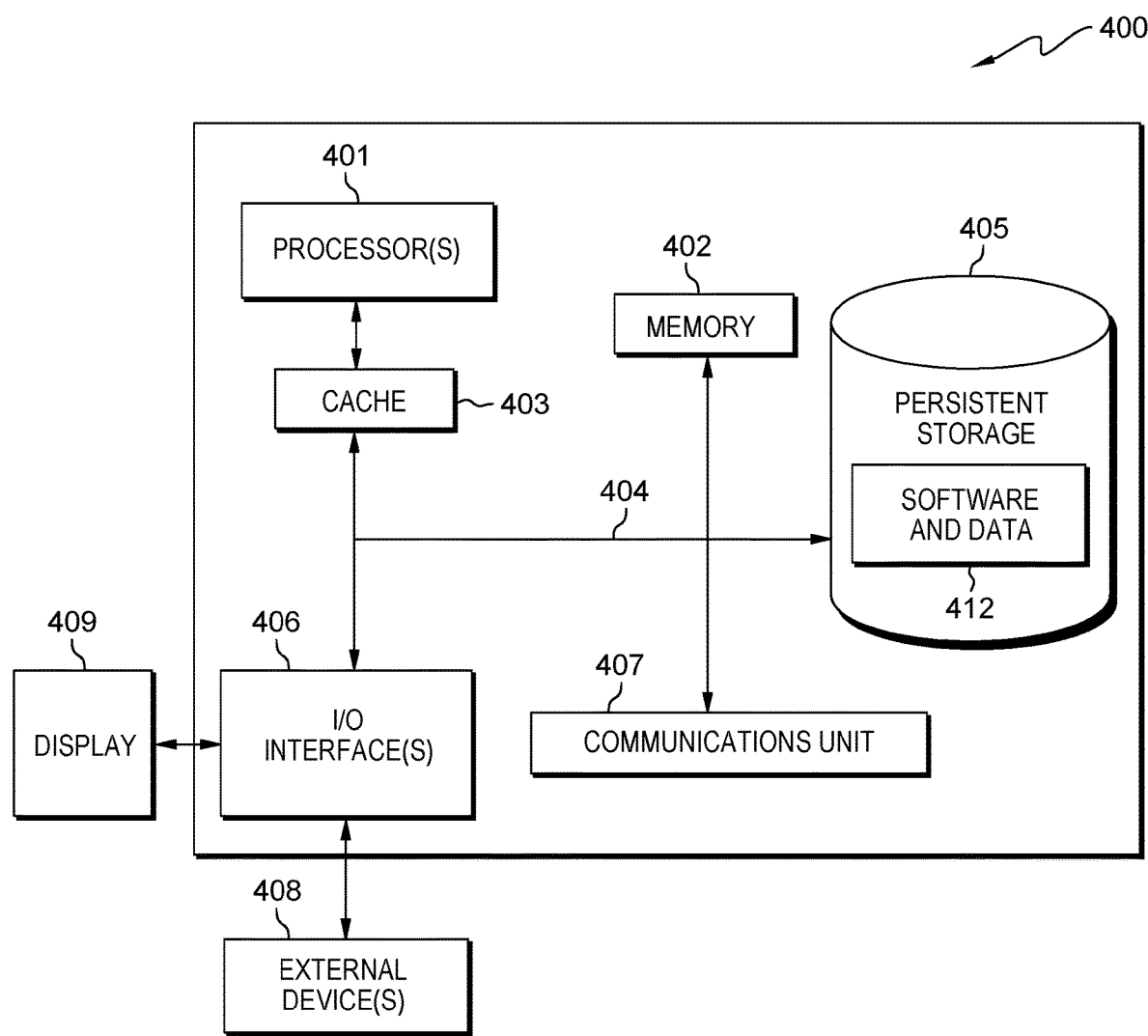
FIG. 4 is a block diagram of components of a computer, in accordance with an embodiment of the present invention.

In an embodiment, communication fabric 120 includes one or more of hardware elements of a computing device discusses in further detail with respect to FIG. 4. Communication fabric 120 may also include an electrical interconnect system, such as a printed wiring board that provides the communication, power, and control functions among elements of hardware elements 105, storage 110, input device 130, and display 140. In some embodiments, a portion of communication fabric 120 operates locally via wired, wireless, or optical connections and can be any combination of connections and protocols (e.g., personal area network (PAN), near field communication (NFC), laser, ultrasonic, etc.). In an example, communication fabric 120 may enable a mobile device of a user to wirelessly communicate with one or more other electronic devices, such as Bluetooth™ enabled instance of input device 130 (e.g., a wireless keyboard) and/or perform screen mirroring via a smart-TV instance of display 140.

In another embodiment, a portion of communication fabric 120 further represents network communications between a computing device of a user, represented by hardware elements 105, one or more elements of storage 110, input device 130, and display 140; and one or more other computing devices or computing systems (not shown). For example, a portion of communication fabric 120 can be a local area network (LAN), a telecommunications network (e.g., a portion of a cellular network), a wireless local area network (WLAN), such as an intranet, a wide area network (WAN), such as the Internet, or any combination of the previous and can include wired, wireless, or fiber optic connections. In general, a portion of communication fabric 120 can be any combination of connections and protocols that will support communications between a computing device of a user and one or more other computing systems or computing devices (not shown), in accordance with embodiments of the present invention.

In one embodiment, input device 130 is representative of a physical keyboard that includes a plurality of illuminated keys represented by input device elements 132. A physical version of input device 130 may be language and format constrained by a respective layout and characters associated with input device elements 132, such as English language character keys arranged in a QWERTY or Colemak layout. In various embodiments, one or more elements of hardware elements 105, such as an input/output interface unit or a CLU (not shown) controls one or more illumination characteristics associated with an element of input device elements 132 (i.e., individual keys).

Illumination characteristics may refer to a color of light, an intensity (i.e., brightness) of light, turning ON or OFF a light source corresponding to a key, strobing the light source corresponding to a key, and/or a strobing patterns assigned to a key. Illuminating a key of a physical keyboard can either affect the illumination of a character depicted on a key or alternatively the background of the key surrounding the character. For example, brightness may be expressed as a percentage of light output ranging from 0% indicating a lack of illumination (i.e., OFF) to ON at 100% (e.g., maximum brightness). In some scenarios, the color of a light source may be limited to colors corresponding to light emitting diodes (LEDs) that illuminates a key of input device elements 132. In other scenarios, a combination of LEDs at differing illumination levels may be used to generate a palette of colors or hues.

In various scenarios, strobing refers to periodic changes in illumination based on rapidly turning an illumination source ON and OFF. Strobing may utilize differing patterns or cyclic variations of illumination to differentiate among instances of input elements 132. For example, if an instance of input device 130 that includes only one color of LED, such as white light LEDs, then input device 130 may be constrained to variations of brightness for potential subsequent characters associated with one predicted word, and variations of brightness and strobing patterns to depict potential subsequent characters of other predicted words. In some scenarios, if illumination intensity cannot be adjusted, then strobing rates and ON/OFF duration periods can create apparent changes in illumination intensity.

In other embodiments, input device 130 is representative of a graphical keyboard or another virtual input device that includes a plurality of graphical control elements (e.g., input device elements 132) that represent and/or correspond to characters of a physical keyboard. Input device elements 132 (i.e., keys) are generated within software for presentation to a user via display 140, such as a touch-screen. Modifying the illumination characteristics of a key of a graphical keyboard can affect the color and brightness associated with a depicted character and the color and brightness of the background of the key surrounding the characters. In one scenario, graphical representations of input device elements 132 are represented within a GUI or a web user interface (WUI) generated within computing device environment 100 for presentation by a touch-screen (e.g., display 140). In another scenario, virtual representations of input device elements 132 are generated within computing device environment 100 for presentation by some instances of display 140 (e.g., smart glasses, a heads-up display, an augmented reality (AR) device, etc.). A user may interface with a virtual instance of input device elements 132 via motion capture, eye tracking, a cyberglove, etc.

In one embodiment, display 140 and input device 130 are singular device, such as a touch screen (e.g., display) that performs both input to a GUI/WUI, and as an output device (e.g., a display) presenting a plurality of icons associated with apps and/or images depicting one or more executing software applications (apps), and in-process text 142 represents user input to the software application that is interfacing with an instance of word prediction program 200. In other embodiments, a software program (e.g., a web browser) can generate various aspects of input device 130 within display 140. In another embodiment, display 140 is representative of an output-only device.

Word prediction program 200 is a program that predicts potential words based on characters input by a user and directs modifying illumination characteristics of subsequent characters corresponding to one or more predicted words. As a user inputs one or more additional characters via input device 130, word prediction program 200 dynamically updates the set of words and related sequences of subsequent characters. In one embodiment, word prediction program 200 execute within a computing device of a user. In another embodiment, various aspects of word prediction program 200 execute on another computing system that is accessible by the computing device of a user, such as accessing a web application accessible on the Internet via a smart-phone.

In an embodiment, word prediction program 200 determines a plurality of predicted words based on one or more characters input by a user. Word prediction program 200 utilizes various criteria and user preferences to rank and select a set of words from among the plurality of predicted words. In response to selecting a set of words, word prediction program 200 determines one or more sequences of potential characters corresponding to the selected set of word. The sequences of potential characters are characters subsequent to (e.g., that follow) the one or more characters input by a user. Word prediction program 200 interfaces with input device control program 300 to indicate (e.g., display) the one or more subsequent characters of a predicted word by modifying the illumination characteristics related to a subsequent character of a predicted word.

In some embodiments, word prediction program 200 also utilizes one or more instances of dictionary 115, historical word sequences 116, and/or contextual dictionary 117 to determine the plurality of predicted words based on one or more characters input by a user. In various embodiments, word prediction program 200 utilizes various aspects of text analytics 114 to filter, sort, and/or rank a plurality of predicted words. In an alternative embodiment, word prediction program 200 executes utilizing predefined words, terms, and phrases input to a file or a document by a user to practice specific character sequences, identify similar words, learn key combinations that generate special characters, and/or practice a combination of key that initiates an action or a function of interest to the user.

Input device control program 300 is a program that modifies the illumination characteristics of one or more input elements of an input device (e.g., a keyboard) to indicate one or more sequences of potential characters respectively associated with a set of words selected by word prediction program 200. Illumination characteristics may include color and intensity. Input device control program 300 can affect characters and associated illumination characteristics of physical keyboards, graphical keyboards, and virtual keyboards. In various embodiments, input device control program 300 modifies the illumination characteristics of various characters based on predictions of words by word prediction program 200 and information within user preferences 113.

In other embodiments, if word prediction program 200 executes external to a computing device of the user (e.g., on the Internet) and a graphical instance of input device 130 (e.g., a WUI) is utilized, then aspects of input device control program 300 can execute external to the computing device of the user. Some aspects of input device control program 300 may be included within graphics subroutines of an Internet-accessible application and are associated with the WUI that generates a graphical or virtual instance of input device 130.

In a further embodiment, input device control program 300 utilizes allocated storage spaces within storage 110 and/or sets of buffers 111 respectively associated with different instance of word prediction program 200 to enable a user to switch between applications, GUI windows, or web browsing tabs. Thereby enabling input device control program 300 to seamlessly restoring previously determined illumination characteristics of input device elements 132 corresponding to an application, GUI window, or web browsing tab in response to a change on focus by a user (e.g., user switches sessions).

Figure 2:
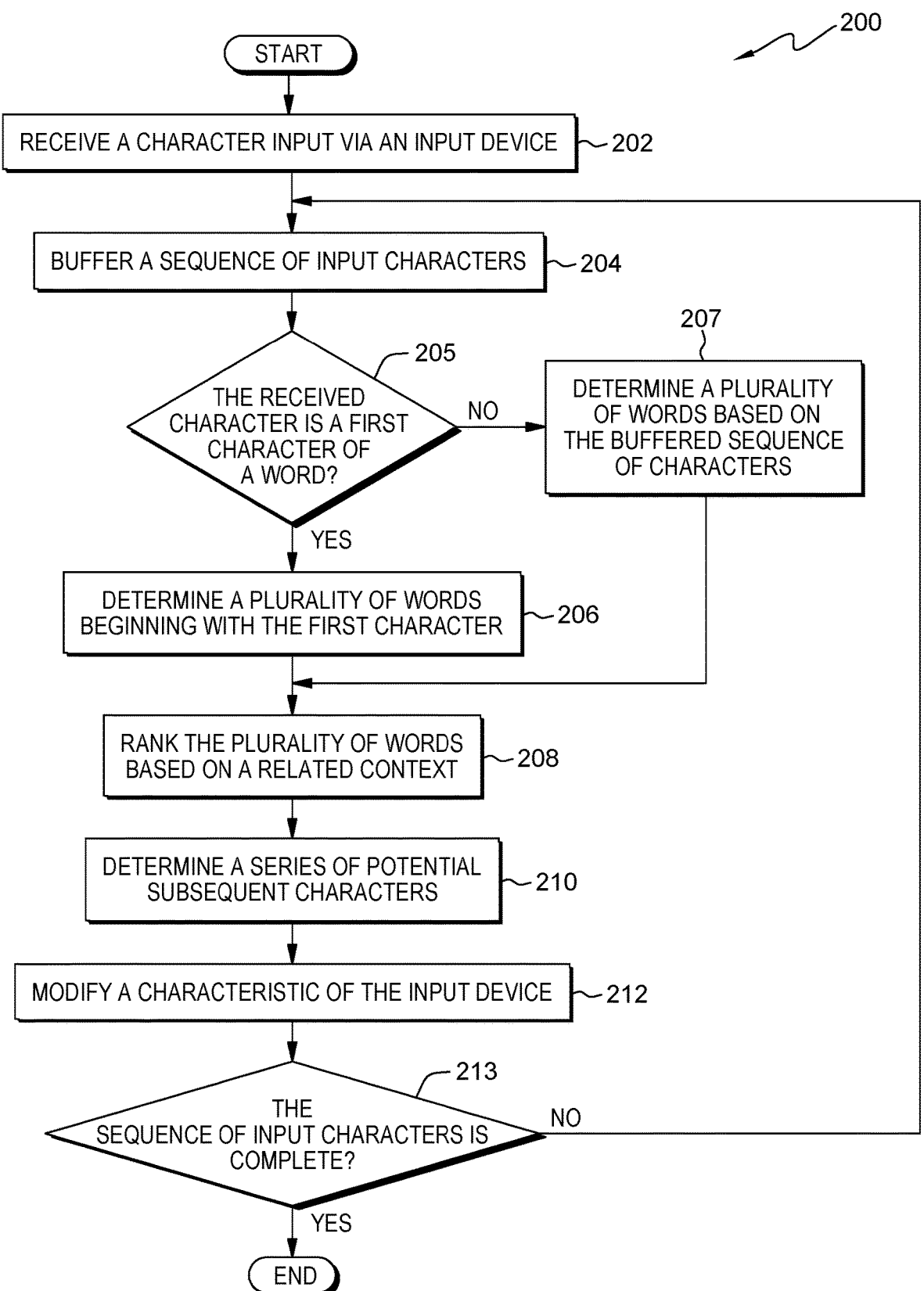
FIG. 2 depicts a flowchart of steps of a word prediction program, in accordance with an embodiment of the present invention.

FIG. 2 is a flowchart depicting operational steps for word prediction program 200, a program for predicting potential words or phrases based on one or more characters input by a user and determining a sequences of subsequent characters respectively associated with one or more predicted words, in accordance with embodiments of the present invention. In various embodiments, word prediction program 200 executes concurrently with a respectively associated instance of input device control program 300. In some embodiments, separate instances of word prediction program 200 can execute in association with software applications executing within respective GUI windows. In other embodiments, one or more aspects of word prediction program 200 execute external to a computing device of a user, such as on the Internet.

In step 202, word prediction program 200 receives a character input via an input device. In one embodiment, word prediction program 200 receives a character input via a physical instance of input device 130, such as a keyboard or a touchscreen. In another embodiment, word prediction program 200 receives a character input via a graphical instance of input device 130, such as a touch-screen keyboard or a virtual keyboard. Received characters are also displayed within in-process text 142.

In various embodiments, word prediction program 200 utilizes information associated with an executing application, input device 130, and/or one or more elements of user preferences 113 to determine a language that the user is utilizing and the keyboard type, arrangement, and/or layout corresponding to the instance of input device 130 that the user utilizes to input characters. In some embodiments, an instance of word prediction program 200 is respectively associated with a software application, a GUI window, or a web browsing tab that receives a character input by the user that corresponds the software application, the GUI window, or the web browsing tab.

In step 204, word prediction program 200 buffers a sequence of input characters. In one embodiment, word prediction program 200 buffers (e.g., stores) one or more characters input by a user for a current word or phrase within one instance of buffers 111. An instance of buffers 111 can be respectively associated with a software application, a GUI window, or a web browsing tab. In another embodiment, word prediction program 200 buffers a sequence characters input by a user that includes the plurality of characters associated with a GUI or an input-element related to in-process text 142. In various embodiments, an instance of word prediction program 200 utilizes and/or maintains a set of buffers 111. For example, word prediction program 200 may utilize a first buffer for a current sequence of characters input by a user; a second buffer that includes at least one previous word, such as parsing to identify a non-hyphenated compound; and a third buffer that includes a plurality of predicted words.

In decision step 205, word prediction program 200 determines whether the received character is a first character of a word. In one embodiment, word prediction program 200 determines that the received character is a first character of a word based on buffers 111 storing a single character. In another embodiment, word prediction program 200 determines that the received character is a first character of another word based on determining that the prior word and space character stored within buffers 111 do not correspond to a potential compound word.

In some embodiments, word prediction program 200 determines that the received character is a first character of a word based on identifying a sequence of one or more characters stored within buffers 111 that signify the end of a previous word or phrase, such as a punctuation mark (e.g., a period, a comma, a semicolon, a bracket, etc.) followed by at least one space character, two space characters, one of a subset a typographical symbol based on context, etc. Alternatively, if a typographical symbol is entered, word prediction program 200 pauses at decision step 205 and awaits another character input via input device 130. For example, with respect to a social media application, word prediction program 200 may determine that a # symbol is the beginning of hashtag word or phrase.

Still referring to decision step 205, in other embodiments if word prediction program 200 determines that the received character within buffers 111 is a special character, punctuation mark, numeric value, etc., that is an isolated initial character, then word prediction program 200 returns to step 202 to receive another character input via an input device 130. In a further embodiment, if the character input by a user, is potentially associated with a subsequent term within a compound word, then word prediction program 200 concurrently executes step 206 and step 207 to generate (e.g., predict) a plurality of words that includes compound words that include the character input by the user.

Responsive to determining that determines that the received character is a first character of a word (Yes branch, decision step 205), word prediction program 200 determines a plurality of words beginning with the first character (step 206).

In step 206, word prediction program 200 determines a plurality of words beginning with the first character. In one embodiment, word prediction program 200 utilizes one or more elements included within user preferences 113 to determining the instance (e.g., language) of dictionary 115 that is utilized to determine (e.g., predict) a plurality words that begin with the first character stored within buffers 111. In another embodiment, word prediction program 200 determines a plurality of words beginning with the first character based on the instance of dictionary 115 that corresponds to the default language of the application that invoked word prediction program 200. In an example, in-process text 142 displays "events were c"; therefore, a buffer of buffers 111 stores the letter "c". In response, word prediction program 200 determine a plurality of words that includes: care, carefully, cancelled, cautiously, control, controlled, completed, completion, could, contentious, cyan, etc.

In some embodiments, word prediction program 200 also identifies one or more additional words that begin with that first character based on words included within historical word sequences 116 and/or contextual dictionary 117. In an example, if word prediction program 200 is invoked while the user is executing a computer-aided design program, then word prediction program 200 identifies words within and/or associated with contextual dictionary 117 that include technical terms, such as terms (i.e., words) associated with electricity, plumbing, construction, chemicals, etc. In various embodiments, word prediction program 200 can also identify one or more additional words that begin with that first character based on compound words included within historical word sequences 116 and/or contextual dictionary 117. Based on the above example, word prediction program 200 may identify the word "computer-controlled".

Referring to decision step 205, responsive to determining that the received character is not the first character of a word (No branch, decision step 205), word prediction program 200 determines a plurality of words based on the buffered sequence of characters (step 207).

In step 207, word prediction program 200 determines a plurality of words based on the buffered sequence of characters. Word prediction program 200 can temporarily store the determined plurality of words within a buffer of buffers 111 or an allocated storage location within storage 110. In various embodiments, word prediction program 200 utilizes one or more elements included within user preferences 113 to determining which instance (e.g., language) of dictionary 115 to utilizes with respect to determining (e.g., predicting) a plurality of words based on the sequence of characters stored within an instance of buffers 111. In one embodiment, word prediction program 200 determines a plurality of words based on the buffered sequence of characters based on the instance of dictionary 115 that corresponds to the default language of the application that invoked word prediction program 200.

In some embodiments, word prediction program 200 also determines one or more additional words that include the sequence of characters stored within an instance of buffers 111 based on words included within historical word sequences 116 and/or contextual dictionary 117. In an example, if word prediction program 200 is invoked while the user is executing a computer-aided design program, then word prediction program 200 identifies words within an instance of contextual dictionary 117 that include technical terms, such as terms (i.e., words) associated with electricity, plumbing, manufacturing, chemicals, etc. In other embodiments, word prediction program 200 also determines one or more compound words that include the sequence of characters stored within an instance of buffers 111 character based on compound words included within historical word sequences 116 and/or contextual dictionary 117.

In step 208, word prediction program 200 ranks the plurality of words based on a related context. In one embodiment, word prediction program 200 determines respective ranking values, orders, and/or creates a set of words from among the determined plurality of words based on criteria within user preferences 113 and/or a context associated with the application that invoked word prediction program 200. In other embodiments, word prediction program 200 determines that the size for the set of words (i.e., the number of words) selected from the ranked plurality of words is further constrained based on information related to computing device environment 100, such as input device 130 is a monochromatically illuminated keyboard. In various embodiments, word prediction program 200 dynamically updates the ranking of a determined plurality of words in response to the user inputting one or more additional characters. Word prediction program 200 can also dynamically update the set of selected words in response to additional characters input by the user.

In some embodiments, word prediction program 200 utilizes one or more aspects of text analytics 114 to filter the determined plurality of words based on one or more previous words input by the user that are depicted within in-process text 142, prior to ranking the determined plurality of words. Referring to the example discussed with respect to step 206, word prediction program 200 filters out the words: "care", "could", "control", "completion", and "cyan" utilizing grammatical and syntactical aspects of text analytics 114 (e.g., relationship determinations). Based on other information and/or criteria, word prediction program 200 determines that the words "controlled", "contentious", and "completed" are ranked higher than the words "cancelled", "cautiously", and "carefully". In another embodiment, word prediction program 200 also utilizes information determined over time by text analytics 114 that is associated with historical word sequences 116 and/or contextual dictionary 117, such as probability, frequency of usage, and context corresponding to words, terms, and/or phrases to determine a ranking value corresponding to the determined plurality of words.

In step 210, word prediction program 200 determines a sequence of potential subsequent characters. In an embodiment, word prediction program 200 stores the determined sequences of potential subsequent characters within a buffer of buffers 111 for access by input device control program 300. In one embodiment, word prediction program 200 utilizes various criteria within user preferences 113 to determine a value for the number of subsequent (e.g., remaining) characters to determine or to present that are respectively associated with the words of the selected set of words. In an example, as discussed above with respect to the example with step 208, the determined set of words includes "controlled", "contentious", "completed", "cancelled", "cautiously", and "carefully". If user preferences 113 indicates that sequences of four or fewer subsequent characters are determined, then word prediction program 200 generates the following sequences of word sequences: "ontr", "onte", "ompl", "ance", "auti", and "aref".

In some embodiments, word prediction program 200 determines that constraints related to input device 130 can dictate a smaller the number of subsequent characters determined for sequences of potential subsequent characters than the criteria within user preferences 113. In an example, if colors of input device 130 cannot be brightness controlled, then word prediction program 200 may reduce the subsequent character sequences to three or fewer characters so that input control program 300 could utilize color strobing at frequencies of 10 Hz, 6 Hz, and 3 Hz.

In step 212, word prediction program 200 modifies a characteristic of the input device. In various embodiments, word prediction program 200 utilizes input device control program 300 to modify one or more characteristics of elements of input device elements 132 of input device 130 that correspond to characters of a sequence of potential subsequent characters respectively associated with one or more predicted words. In some embodiment, different instances of word prediction program 200 share interfacing with input device control program 300 to modify one or more characteristics of elements of input device elements 132 of input device 130 that correspond to characters of a sequence of potential subsequent characters respectively associated with one or more predicted words related to an instance of word prediction program 200.

In decision step 213, word prediction program 200 determines whether the sequence of input characters in complete. In one embodiment, word prediction program 200 determines that the sequence of input characters is complete based on a determination made by input device control program 300 (discussed in further detail with respect to FIG. 3, step 309). In another embodiment, word prediction program 200 determines that the sequence of input characters is complete based on a determination made by input device control program 300 (discussed in further detail with respect to FIG. 3, step 309).

Responsive to determining that the sequence of input characters is not complete (No branch, decision step 213), word prediction program 200 loop to append another character input by a user to a buffer of buffers 111 (step 204).

Referring to decision step 213, in one embodiment, responsive to determining that the sequence of input characters is complete (Yes branch, decision step 213), word prediction program 200 terminates. In another embodiment, responsive to determining that the sequence of input characters is complete (Yes branch, decision step 213), word prediction program 200 migrates the current word (e.g., the completed sequence of input characters) to another buffer of buffers 111 and waits to receive another character input by a user via input device 130 (step 202). Word prediction program 200 may continue to execute and loop until the user manually disables word prediction program 200 or the application that invoked word prediction program 200 ceases to execute.

Figure 3:
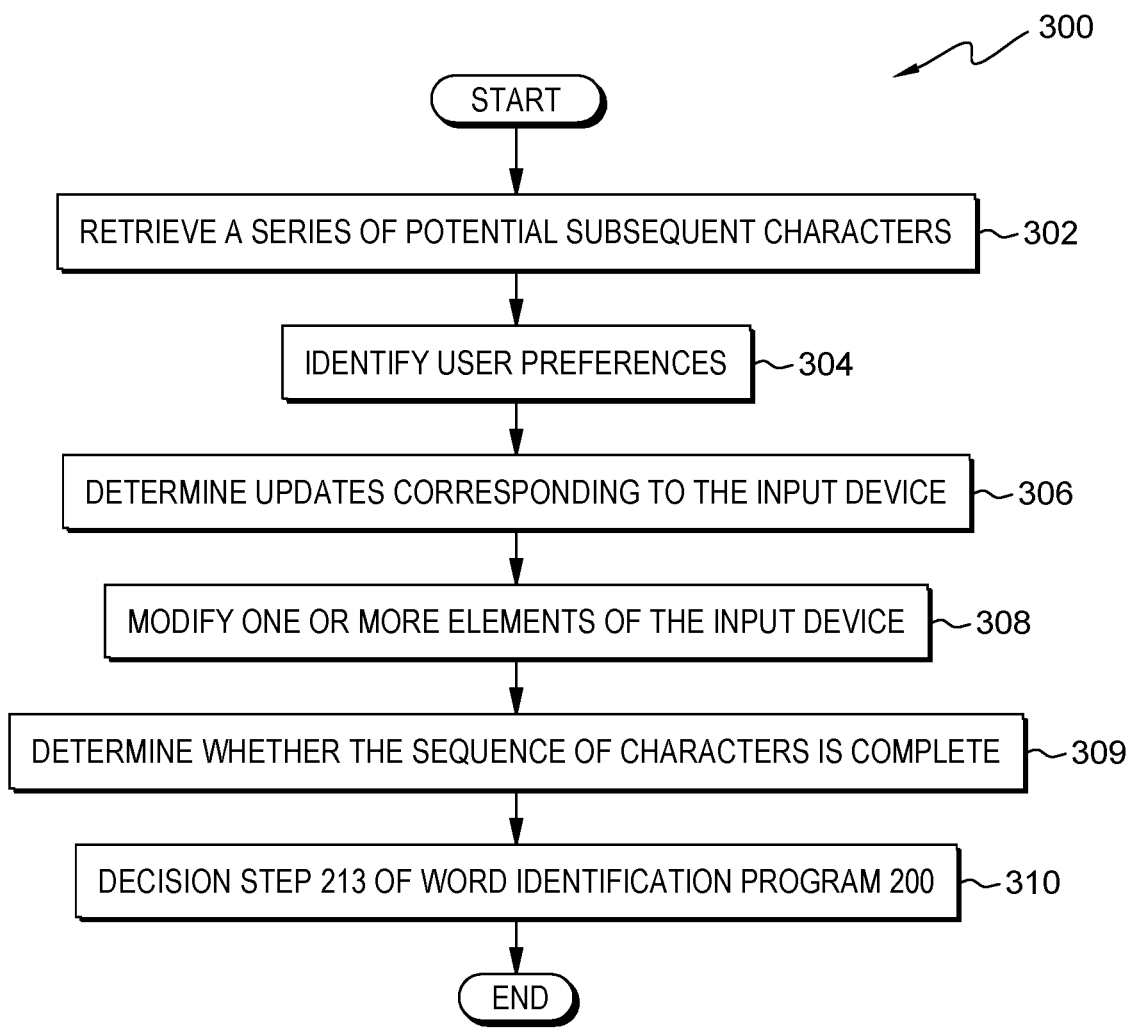
FIG. 3 depicts a flowchart of steps of an input device control program, in accordance with an embodiment of the present invention.

FIG. 3 is a flowchart depicting operational steps for input device control program 300, a program that dynamically modifies the illumination characteristics of one or more elements (e.g., keys) of a physical, a graphical, or a virtual input device in response to user inputs, in accordance with embodiments of the present invention. In one embodiment, one or more aspects of input device control program 300 execute concurrently with word prediction program 200. In another embodiment, input device control program 300 is controlled by an instance of word prediction program 200. In some embodiments, one instance of input device control program 300 can interface with multiple instances of word prediction program 200 respectively associated with differing applications, GUI windows, and/or web browsing tabs.

In step 302, input device control program 300 retrieves a sequence of potential subsequent characters. Input device control program 300 retrieves sequences of potential subsequent characters that correspond to the set of words that were ranked and selected by word prediction program 200. In one embodiment, input device control program 300 retrieves a sequence of potential subsequent characters from a buffer of buffers 111. In another embodiment, input device control program 300 retrieves a sequence of potential subsequent characters from another location (not shown) within storage 110. In an alternative embodiment, input device control program 300 retrieves a sequence of potential subsequent characters from a source external to the computing device of the user. For example, if input device control program 300 interfaces with an instance of word prediction program 200 executing on the Internet, then input device control program 300 retrieves a sequence of potential subsequent characters from the instance of buffers 111 stored on a computing system hosting word prediction program 200.

In step 304, input device control program 300 identifies user preferences. In one embodiment, input device control program 300 identifies one or more elements from within user preferences 113. User preferences 113 may include one or more rules associated with the illumination (e.g., color, intensity, shading, strobing, etc.) of potential subsequent characters, a size for the set of predicted words, a color assigned to a selected word based on a ranking value, and preferences related to differing instances of input device 130 (e.g., graphical keyboards, physical keyboards of differing manufactures, etc.).

In one example, input device control program 300 may identify rules that dictate the illumination level changes for subsequent characters based on color, such as a 10% brightness change per subsequent character for red and blue hues; but a 20% brightness change per illumination level for yellow hues. In another example, input device control program 300 determines that a color assigned to a first predicted word is green and that four levels of brightness are utilize: 90% for the first potential character, 70% for the second potential character, 60% for the third potential character, and 40% the fourth or later potential characters. Input device control program 300 determines that a second predicted word is assigned the color red and that the first character that differs from the characters of the first predicted word is assigned an 80% brightness level.

In another embodiment, input device control program 300 selects from among a plurality of elements included within user preferences 113 based on one or more factors, such as keyboard layout that is applied to input device 130, the executing application that invoked word prediction program 200, the formatting of elements of display 140, etc. In one example, input device control program 300 selects one set of elements from user preferences 113 in response to a user executing a texting application; and another set of elements in response to the user performing word-processing on a document that is associated with a custom dictionary.

In step 306, input device control program 300 determines updates corresponding to the input device. In one embodiment, input device control program 300 determines one or more updates respectively applied to input elements 132 of input device 130 based on information obtained in step 302, step 304, and based on a set of words corresponding to the first character input by a user. In another embodiment, determines updates one or more characteristics respectively applied to input elements 132 of input device 130 based on information obtained in step 302, step 304, and further based on the illumination characteristics applied to applied to a prior set of characters corresponding to one or more predicted words.

In one example, input device control program 300 assigns the color of orange to the letter "o" that corresponds previously discussed group of words that includes "controlled", "contentious", and "completed". Further, input device control program 300 also determines that the strings of characters beginning with "c" and flowed by "o" diverge into other words and subsequently assign the color red to the letters "n" and "t"; and the color yellow to the letters "m" and "p". To indicate the order of the subsequent letters of a sequence, input device control program 300 further assigns a brightness level of 100% to the first letter of a sequence after the letter "o" and 80% brightness the second letter of a sequence after the letter "o", such as "t". In some scenarios, input device control program 300 can identify later characters that are common to two or more different words such as the letter "n" is common to "controlled" and "contentious". In one example, input device control program 300 assign "n" the color purple. In another example, with respect to a virtual keyboard input device control program 300 illuminates the letter "n" with white and splits the background of the key between red and blue; thereby associating the letter "n" with two different predicted words and respective character sequences.

Still referring to step 306, in another example input device control program 300 assigns the color of blue to the letter "a" that corresponds previously discussed group of words that includes "cancelled", "cautiously", and "carefully". Input device control program 300 may determine that if rankings of "cancelled", "cautiously", and "carefully" are lower than "controlled", "contentious", and "completed", then input device control program 300 does not utilize alternative colors for divergent character sequences. Input device control program 300 assigned blue 100% to the letter "a" and blue 80% to the letters "r", "n", and "u". Input device control program 300 also deactivates the illumination of a newly input character unless a potential subsequent character is the same as the newly input character, such as the double e's of the word "keep", or the double t's of the word "little".

In some embodiments, input device control program 300 determines updates one or more updates respectively applied to input elements 132 of input device 130 based on information obtained in step 302 and 304 and one or more elements of user preferences 113 related to compound words. In various embodiments, input device control program 300 determines updates one or more updates respectively applied to input elements 132 of input device 130 based on determining that a user switches among two or more software applications that are respectively associated with different instances of word prediction program 200, such as switching between a texting application and a word-processing application. In other embodiments, if input device control program 300 determines that input device 130 is a graphical or virtual input device, then input device control program 300 can determine to modify both the illumination characteristics of a character (e.g., foreground illumination) and the illumination characteristics of input device element corresponding to or surrounding a character.

Still referring to step 306, if input device control program 300 determines that input device 130 includes constraints, such as monochrome illumination, then input device control program 300 determines the characteristics that are associated with a smaller set of ranked words, such as the group of words discussed with respect to the previous example that includes "controlled", "contentious", and "completed". In an example, input device control program 300 determines to illuminate the letter "o" at 100% brightness, "n" at 75% brightness and "t" at 50% brightness for the words that include four common sequential characters. Further, input device control program 300 determines to illuminate the characters corresponding to the word "completed" at 50% ON/OFF strobing pattern; the letter "m" is assigned a 10 Hz rate, the letter "p" is assigned a 6 Hz strobing rate, and the letter "l" is assigned a 3 Hz strobing rate.

In step 308, input device control program 300 modifies one or more elements of the input device. Input device control program 300 modifies one or more input device elements 132 based on the modifications determined in step 306. In one embodiment, input device control program 300 modifies one or more input device elements 132 of the physical instance of input device 130 (i.e., a keyboard) by interfacing with one or more elements of hardware elements 105 that control input device 130. In another embodiment, input device control program 300 modifies one or more input device elements 132 of the graphical instance of input device 130 by interfacing with graphics processor or graphics control program (not shown) of the computing device of a user that generates the graphical instance of input device 130 on display 140, such as a touch-screen keyboard.

In an alternate embodiment, if input device control program 300 is executing external to the computing device of the user, then input device control program 300 interfaces with a graphics subroutine of an Internet-accessible application that is generating the WUI of the web application (not shown) that invoked word prediction program 200. In response, WUI modifies one or more input device elements 132 of the graphical instance or the virtual instance of input device 130 for presentation to the user by display 140 or an augmented reality device.

In step 309, input device control program 300 determines whether the sequence of characters is complete. Input device control program 300 may utilize one or more aspects of text analytics 114, one or more instances of dictionary 115 (e.g., differing language dictionaries), contextual dictionary 117, or a combination thereof to determine whether the sequence of characters corresponding to a predicted word is complete. In various embodiments, input device control program 300 utilizes text analytics 114 and an instance of dictionary 115 to determine the structure of word and determine whether a special character and/or a punctuation mark is included within the sequence of characters that corresponds to a predicted word.

In one embodiment, input device control program 300 determines whether the sequence of characters corresponding to a predicted word is complete based on identifying that the next character input via input device 130 is a punctuation mark. In one scenario, input device control program 300 determines that the sequence of characters corresponding to a predicted word is complete based on determining that the last character of the input sequence of characters is a type of punctuation mark related to sentence structure change, such a period, a semi-colon, a colon, a quotation mark, etc. In an example, input device control program 300 determines that the sequence of characters corresponding to a predicted word is complete based on determining that the last character of the input sequence of characters is an apostrophe indicating a possessive of a plural form of a word, such as teams'. In another scenario, input device control program 300 determines that the sequence of characters corresponding to a predicted word is not complete based on determining that the last character of the input sequence of characters is a type of punctuation mark related a compound word, conjunction, contraction, etc., such as a hyphen, an apostrophe, a forward slash, etc. Examples, of character sequences that include punctuation marks that do not indicate the completion of a character sequence include: spell-checking, up-to-date, and/or, didn't, it's, etc.

Still referring to step 309, in some embodiments input device control program 300 determines whether the sequence of characters corresponding to a predicted word is complete based on determining that the last character of the input sequence of characters is a space. Input device control program 300 may further include one or more previous words stored within a portion of buffers 111 in an analysis to determine whether the sequence of characters corresponding to a predicted word is complete. For example, input device control program 300 may determine the current sequence of characters forms (i.e., completes) the second term of a two word, unhyphenated, compound word, such as player piano or snow white. However, the words player or snow without a context do not include sufficient meaning for input device control program 300 to determine that the current sequence of characters was complete.

In step 310, input device control program 300 executes decision step 213 of word prediction program 200 (discussed previously with regard to FIG. 2).

FIG. 4 depicts computer system 400, which is representative of one or more portions of computing device environment 100. Computer system 400 is an example of a system that includes software and data 412. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch. In an embodiment, communications fabric 404 is representative of communication fabric 120.

Memory 402 and persistent storage 405 are computer readable storage media. In this embodiment, memory 402 includes random-access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402. In an embodiment, a portion of memory 402 is allocated to buffers 111.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information. In an embodiment, persistent storage 405 include storage 110.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to computing device environment 100 software and data 412 includes keyboard layouts 112, user preferences 113, text analytics 114, dictionary 115, historical word sequences 116, contextual dictionary 117, word prediction program 200, and input device control program 300, and other programs and data (not shown).

Communications unit 407, in these examples, provides for communications with other data processing systems or devices, including resources and program executing on the Internet (not shown). In these examples, communications unit 407 includes one or more network interface cards. Communications unit 407 may provide communications, through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device that can represent input device 130. External device(s) 408 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409, which is representative of display 140.

Display 409 provides a mechanism to display data to a user and may be, for example, a computer monitor. In an embodiment display 409 is representative of display 140. Display 409 can also function as a touch screen, such as the display of a tablet computer or a smartphone. Alternatively, display 409 displays information to a user based on a projection technology, such as virtual retinal display, a virtual display, etc. In various embodiments, display 409 is utilized to generate and receive input from a graphical or a virtual instance of input device 130.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a sequence of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more computer processors, a first character input to an input interface of an executing application utilizing a keyboard, the keyboard including a plurality of input elements that correspond to respective characters;
   determining, by one or more computer processors, a plurality of words that begin with the first received character;
   ranking, by one or more computer processors, the determined plurality of words based on contextual information of respective instances of the plurality of words relative to the executing application;
   selecting, by one or more computer processors, a group of words from among the ranked plurality of words based on a first set of criteria, wherein the first set of criteria include ranking nouns higher than adjectives and adjectives higher than adverbs;
   determining, by one or more computer processors, a respective sequence of characters after the received first character that corresponds to each word of the selected group of words based on a first user preference; and
   modifying, by one or more computer processors, one or more respective characteristics of input elements of the keyboard that correspond to the respective sequences of characters of the selected group of words based on determining sub-groups of words from among the selected group of words, wherein the modification is done to the input elements of the keyboard by strobing a light of the input elements of the keyboard at frequencies selected from the group consisting of 10 Hz, 6 Hz, and 3 Hz.

2. The method of claim 1, wherein the keyboard is selected from the group consisting of a physical keyboard, a graphical representation of a keyboard, a touch-screen keyboard, and a virtual representation of a keyboard.

3. The method of claim 1, further comprising:
   determining, by one or more computer processors, that one or more other words were input prior to receiving the first character, wherein the received first character is associated with a subsequent word to the one or more other words;
   determining, by one or more computer processors, a relationship among the one or more other words that were input prior to inputting the first character of the subsequent word; and
   filtering, by one or more computer processors, the plurality of words that begin with the first input character to determine one or more other groups of words based on the determined relationship.

4. The method of claim 3, wherein the relationship among the one or more other words that were input prior to inputting the first character of the subsequent word is selected from the group consisting of a grammatical relationship, a syntactical relationship, and a contextual relationship.

5. The method of claim 1, wherein:
   the plurality of input elements respectively depict a character of the keyboard; and
   the one or more respective characteristics of an input element include characteristics selected from the group consisting of: an illumination color assigned to a character corresponding to a string of characters common to one or more words, one or more other illumination colors assigned to background of the input element surrounding the character, a strobing frequency associated with the illumination, a strobing pattern associated with the illumination, and an illumination brightness percentage.

6. The method of claim 1, wherein selecting a group of words from among the ranked plurality of words based on a first set of criteria further comprises:
   filtering, by one or more processors, the plurality of words that begin with the first received character based on one or more previous words input into the input interface of the executing application utilizing the keyboard; and
   selecting, by one or more processors, the word from among the ranked plurality of words based on the first set of criteria, the first set of criteria including contextual information of word usage in the executing application.

7. The method of claim 6, wherein the contextual information of word usage in the executing application is selected from the group consisting of: context of usage of words within the application and probability of word usage within the application.

8. The method of claim 1, wherein modifying, by one or more processors, respective colors of the input elements that correspond to the respective sequences of characters of the selected group of words based on a user preference associated with sub-groups of words further comprises:
   determining, by one or more computer processors, an occurrence of a character where the respective sequences of characters corresponding to the selected group of words branch into a first sub-group of words and a second sub-group of words; and
   assigning, by one or more computer processors, a color different from the color assigned to the first sub-group of words and the color assigned to the second subgroup of words to a sequence of characters common to the first sub-group of words and the second subgroup of words that includes the first input character.

9. The method of claim 1, wherein modifying, by one or more processors, respective colors of the input elements that correspond to the respective sequences of characters of the selected group of words based on a user preference associated with sub-groups of words further comprises:
   determining, by one or more computer processors, an occurrence of another character common to the respective sequences of characters corresponding a first sub-group of words and a second sub-group of words after the respective sequences of characters corresponding the first sub-group of words and the second sub-group of words diverge; and
   applying, by one or more processors, a different illumination scheme to the input element corresponding to the other character common the first sub-group of words and the second subgroup of words after the respective sequences of characters corresponding the first sub-group of words and the second sub-group of words diverge.

10. The method of claim 9, wherein the different illumination scheme displays the background surrounding the other character split among the color assigned to the first sub-group of words and the color assigned to the second subgroup of words, and assigns a third color to illuminate the other character.

11. A computer program product comprising:
one or more computer readable storage media and program instructions stored on the one or more computer readable storage media, the program instructions readable/executable by one or more computer processors:
program instructions to receive a first character input to an input interface of an executing application utilizing a keyboard, the keyboard including a plurality of input elements that correspond to respective characters;
program instructions to determine a plurality of words that begin with the first received character;
program instructions to rank the determined plurality of words based on contextual information of respective instances of the plurality of words relative to the executing application;
program instructions to select a group of words from among the ranked plurality of words based on a first set of criteria, wherein the first set of criteria include ranking nouns higher than adjectives and adjectives higher than adverbs;
program instructions to determine a respective sequence of characters after the received first character that corresponds to each word of the selected group of words based on a first user preference; and
program instructions to modify one or more respective characteristics of input elements of the keyboard that correspond to the respective sequences of characters of the selected group of words based on determining sub-groups of words from among the selected group of words, wherein the modification is done to the input elements of the keyboard by strobing a light of the input elements of the keyboard at frequencies selected from the group consisting of 10 Hz, 6 Hz, and 3 Hz.

12. The computer program product of claim 11, wherein the keyboard is selected from the group consisting of a physical keyboard, a graphical representation of a keyboard, a touch-screen keyboard, and a virtual representation of a keyboard.

13. The computer program product of claim 11, further comprising:
program instructions to determine that one or more other words were input prior to receiving the first character, wherein the received first character is associated with a subsequent word to the one or more other words;
program instructions to determine a relationship among the one or more other words that were input prior to inputting the first character of the subsequent word; and
program instructions to filter the plurality of words that begin with the first input character to determine one or more other groups of words based on the determined relationship.

14. The computer program product of claim 13, wherein the relationship among the one or more other words that were input prior to inputting the first character of the subsequent word is selected from the group consisting of a grammatical relationship, a syntactical relationship, and a contextual relationship.

15. The computer program product of claim 11, wherein:
the plurality of input elements respectively depict a character of the keyboard; and
the one or more respective characteristics of an input element include characteristics selected from the group consisting of: an illumination color assigned to a character corresponding to a string of characters common to one or more words, one or more other illumination colors assigned to background of the input element surrounding the character, a strobing frequency associated with the illumination, a strobing pattern associated with the illumination, and an illumination brightness percentage.

16. A computer system for modifying illumination characteristic of an input device to identify characters of a word, the computer system comprising:
one or more computer processors;
one or more computer readable storage media; and
program instructions stored on the computer readable storage media for execution by at least one of the one or more computer processors, the program instructions comprising:
program instructions to receive a first character input to an input interface of an executing application utilizing a keyboard, the keyboard including a plurality of input elements that correspond to respective characters;
program instructions to determine a plurality of words that begin with the first received character;
program instructions to rank the determined plurality of words based on contextual information of respective instances of the plurality of words relative to the executing application;
program instructions to select a group of words from among the ranked plurality of words based on a first set of criteria, wherein the first set of criteria include ranking nouns higher than adjectives and adjectives higher than adverbs;
program instructions to determine a respective sequence of characters after the received first character that corresponds to each word of the selected group of words based on a first user preference; and
program instructions to modify one or more respective characteristics of input elements of the keyboard that correspond to the respective sequences of characters of the selected group of words based on determining sub-groups of words from among the selected group of words, wherein the modification is done to the input elements of the keyboard by strobing a light of the input elements of the keyboard at frequencies selected from the group consisting of 10 Hz, 6 Hz, and 3 Hz.

17. The computer system of claim 16, wherein the keyboard is selected from the group consisting of a physical keyboard, a graphical representation of a keyboard, a touch-screen keyboard, and a virtual representation of a keyboard.

18. The computer system of claim 16, further comprising:
program instructions to determine that one or more other words were input prior to receiving the first character, wherein the received first character is associated with a subsequent word to the one or more other words;
program instructions to determine a relationship among the one or more other words that were input prior to inputting the first character of the subsequent word; and
program instructions to filter the plurality of words that begin with the first input character to determine one or more other groups of words based on the determined relationship.

19. The computer system of claim 18, wherein the relationship among the one or more other words that were input prior to inputting the first character of the subsequent word is selected from the group consisting of a grammatical relationship, a syntactical relationship, and a contextual relationship.

20. The computer system of claim 16, wherein:
- the plurality of input elements respectively depict a character of the keyboard; and
- the one or more respective characteristics of an input element include characteristics selected from the group consisting of: an illumination color assigned to a character corresponding to a sequence of characters common to one or more words, one or more other illumination colors assigned to background of the input element surrounding the character, a strobing frequency associated with the illumination, a strobing pattern associated with the illumination, and an illumination brightness percentage.

* * * * *